March 18, 1952     C. W. TINKHAM     2,589,456
STATIC TRUCK WHEEL BALANCER
Filed Dec. 2, 1947     2 SHEETS—SHEET 1
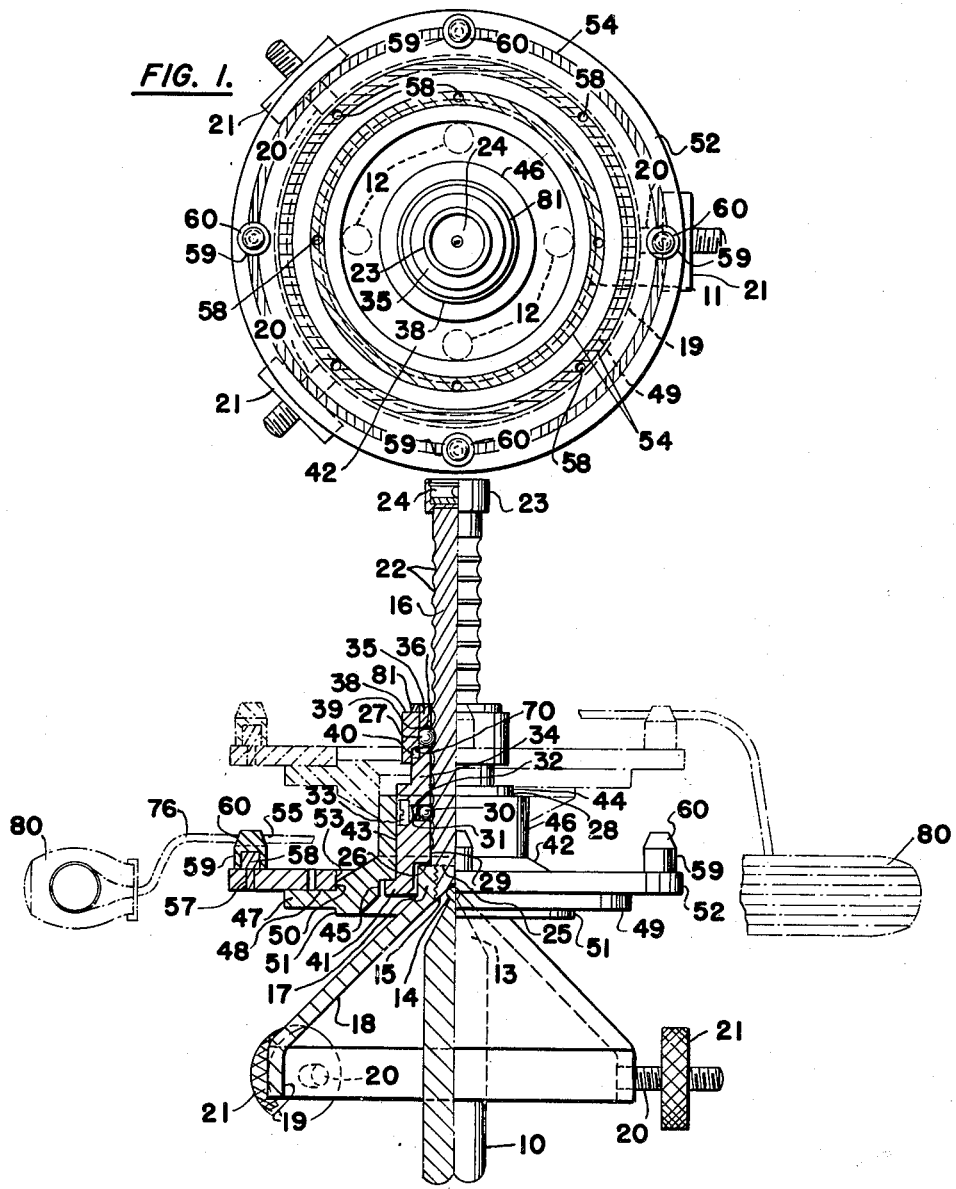
INVENTOR.
CHARLES W. TINKHAM
BY Howard J. Whelan,
ATTORNEY March 18, 1952     C. W. TINKHAM     2,589,456
STATIC TRUCK WHEEL BALANCER
Filed Dec. 2, 1947     2 SHEETS—SHEET 2
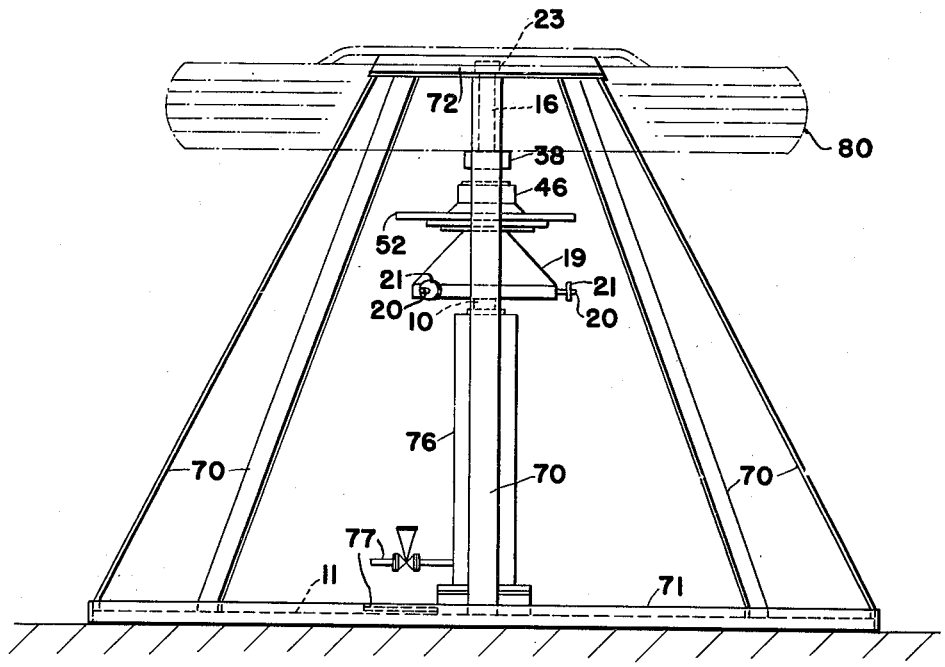
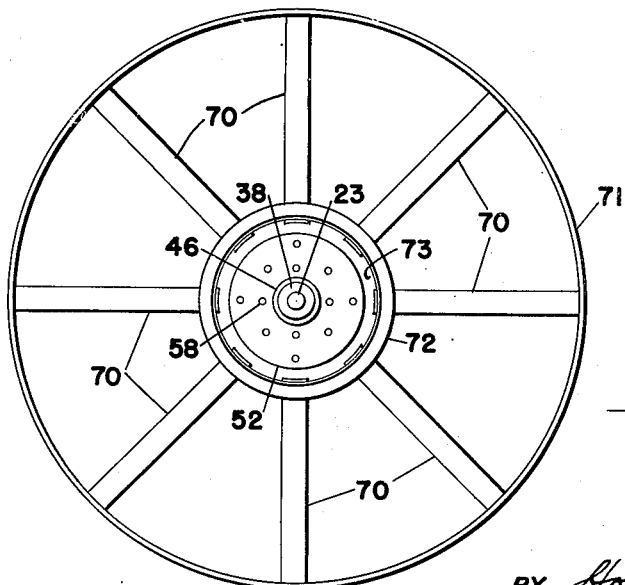
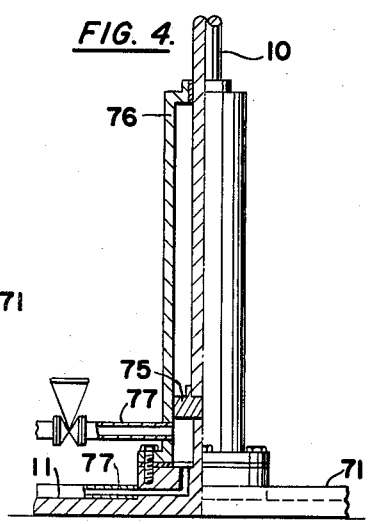
INVENTOR.
CHARLES W. TINKHAM
BY Howard J. Whelan,
ATTORNEY Patented Mar. 18, 1952

2,589,456

UNITED STATES PATENT OFFICE 2,589,456

STATIC TRUCK WHEEL BALANCER

Charles W. Tinkham, Baltimore, Md.

Application December 2, 1947, Serial No. 789,187

4 Claims. (Cl. 73—66)

This invention relates to wheels and more particularly to a device for determining the accuracy of balance of a wheel for a motor vehicle.

Wheels on trucks and modern motor vehicles, are conventionally supplied with rubber tires subject to being run at high speeds. These speeds may at times reach a rate of eighty miles an hour or a peripheral speed commensurate with that rate. At this rate of travel any unbalance of the wheel will induce a pounding or wobbling effect in the wheel which causes unequal wear in the tire and makes the vehicle harder to handle. It has been found therefore highly desirable to make the balance of the wheels for motor vehicles as perfect as is practically possible. In balancing machines previously used, it has been customary to spin the wheel and tire and from its action visually determine whether it is balanced or not. The objection to this method is that it requires the starting and stopping of the rotation many times and many hit-and-miss adjustments to make the wheel run smoothly. It requires considerable time to attain the desired results by this method, and a motor or other power unit to operate it.

It is therefore an object of the present invention, to provide a new and improved machine for evaluating the balance of a wheel that will avoid one or more of the disadvantages and limitations of the previous art.

Another object of this invention is to provide a new and improved machine for evaluating the accuracy of balance of a wheel in a convenient and effective manner.

A further object of the invention is to provide a new and improved machine for evaluating the accuracy of balance of a wheel by static method.

Still another object of the invention is to provide a new and improved machine for evaluating the accuracy of balance of a truck wheel with tire in an expeditious and easy way.

Other objects will become apparent as the invention is more fully described.

For a better understanding of the invention and the objects thereof reference is made to the accompanying drawings, and the following description. The two together illustrate a particular form of the invention by way of example, and indicate the principles involved, while the claims particularly point out the scope of the invention.

In the drawings:

Figure 1 is a plan view showing a mechanism for fitting and evaluating the balance of a wheel embodying this invention, without the base structure, Figure 2 is a side elevation partly in section of Figure 1, Figure 3 is a side elevation of the device, with a wheel indicated thereon in dotted outline, Figure 4 is a detail of the hydraulic mechanism used in this embodiment, Figure 5 is a plan view of Figure 3.

Similar reference numerals pertain to the same parts throughout the drawings.

The particular form of the invention shown in the drawings indicates a machine for evaluating the balance of a truck wheel with tire thereon. It consists of a pedestal 10 having a large circular base 11 preferably arranged with holes 12 for bolting it to the ground or floor on which the device is to be operated. The pedestal is arranged with a spindle having a tapered upper end portion 13, the apex terminal 14 of which is preferably rounded into a ball-like contour. This terminal serves as a frictionless type of support on which the cone-like recessed lower end portion 15 of a column 16 can rest and freely rotate or move in any tilting direction thereon. The exterior of the end portion 15 of the column 16 is reduced in diameter and screw threaded into the restricted neck 17 of a bell-form hood 18 tapering from the neck 17 downwardly and outwardly to a cylindrical skirt 19. This skirt is drilled and threaded with holes 20 spaced equidistantly about it. These holes 20 are arranged to receive adjustably positioned therein, screw weight elements 21, used for producing a balance in the hood when it is out of balance.

The column 16 is of a general cylindrical form and provided with a series of transverse peripheral grooves 22 spaced throughout its length. The upper end terminates in an enlarged cap 23 in which a circular bubble level 24 is inserted. When the column 16 is screwed into the neck 17 its lower ledge 25 butts up against the upper surface 26 of the neck to make it tight. The grooves 22 are of circular cross-section so that a predetermined sized ball 27 can engage therein. A collar 28 is provided with a hole 29 and slides over the column 16. The collar is provided with a ball 30 which reciprocates in a cylindrical recess 31 through the action of a spring 32, which is held in place by a plug 33. The ball 30 fits any of the peripheral grooves 22 in the column 16 when aligned therewith, and is used to hold the collar 28 at predetermined positions on the column 16 and to give a clicking signal when the ball 30 in the collar reaches the selected groove 22. This enables the collar to be adjusted vertically on the column 16. The upper portion 34 of the collar is reduced in diameter externally for a distance and then again reduced in diameter to form a step shoulder 35. It is provided with holes 36 transversely positioned to receive balls 27 which are depressed into the grooves 22 through the action of a race collar 38. The race collar 38 is provided with a central hole 39 to allow it to be slid over the collar 28. The lower end of the hole 39 is tapered downwardly and outwardly to form a wedge 70 that will press the balls 27 into the chosen groove 22 when the race collar 38 is pressed down towards the upper portion 34 of the collar which it fits over. The lower end of the race collar 38 is provided with a hole 40 that fits over the upper portion 34 in a slidable manner. The upper end of the collar 28 is provided with a stop ring 81 to limit the travel of the race collar 38 thereon. The lower end portion of the collar 28 is provided with a flange 41.

A supporting plate 42 of circular form having a hole 43, slidably fits over the surface 44 of the collar 38. The lower portion of the supporting plate 42 is recessed at 45 to encompass and rest on the flange 41 mounted on the lower end portion of the collar 28 and be supported thereby. The supporting plate 42 is provided with a vertical cylindrical extension 46 which slides over the surface 44 of the collar 28 and aligns the supporting plate therewith. The lower end of the supporting plate 42 is provided with a circular ledge 47 having an upper surface 48 and a lower surface 49 which terminate with the shoulders 50 and 51 respectively. An annular plate or disc 52 of circular outline with a relatively large central hole 53 is designed to fit on the ledge 47 so it will retain its relative axial position thereon, by reason of the shoulders 50 or 51 engaging the inner edge of the hole 53. This annular plate or disc 52 is provided with several concentric rings 54 painted in colors or embossed thereon. Each of these rings conforms with the bolt circles 55 of different vehicle wheels 80 to be tested on the machine. Holes 57 for studs 58 are arranged therein, and over the studs are placed thimbles 59 suitably tapered at 60 to facilitate the centering and holding of the various wheel discs 76 thereon. There are some 385 types of truck wheels at present on the market, with about 11 variations in their bolt hole arrangements. These may all be provided for, in the use of four standard plates 52 arranged with the proper disposition of the holes for the thimbles 59, which will be positioned on the plates 52. The variation of the width of the wheel discs can be taken care of, by positioning the supporting plate 42 either as indicated in Figure 2, or by inverting it as shown in the dotted outline on Figure 2. In one case the annular plate or disc 52 will rest on the surface 48, whereas in the other it will rest on the surface 49. In the latter instance the end of the extension 46 will rest on the flange 41.

In the operation and use of these parts of the device, the collar 28 with the race collar 38 and balls 27 mounted therein is slid over the column 16 which is screwed into the hood 18 and adjusted to a selected horizontal plane. The supporting plate 42 is positioned on the collar 28 and the assembly is then mounted on the pedestal 10 wherever it has been located. The annular plate or disc 52 is selected to suit the wheel to be worked on and is positioned on the ledge 47. The thimbles 59 are then positioned on the studs 58 to suit the bolt circle of the wheel being worked on. When this has been completed the weight elements 21 are screwed out or in until the level 24 shows the device as being level. The wheel to be tested for balance is then positioned on the thimbles 59 and then the amount which it is out of balance is determined. This is corrected for by adding lead weights or the like to balance the wheel, as is conventionally done at the present time. When the wheel is placed on the device, it is so placed that its center of gravity is aligned as close to the apex terminal 14 as is practical. This is obtained by moving the collar 28 up or down on the column 16 to suit, and locking it in place by pressing down on the collar 38 to lock the balls 27 in the selected groove 22 to hold them in this position, until it is desired to change them. When the disc of the wheel is especially large the supporting plate 42 is reversed to the position shown in dotted lines in Figure 2 and the annular plate 52 positioned on the surface 49 to which is added the wheel disc. The reversal of the supporting plate 42 allows a wheel whether of shallow or deep dish, to be tested and trued on the one device without lengthening the column 16 to suit.

While the balancing mechanism just described can operate as above described, using the pedestal with its spindle as the pivot on which to balance the supporting plate on which the wheel is mounted, the matter of placing the wheel on the supporting plate has not been discussed. To provide for the wheels that are particularly heavy, means are included to enable the user to handle them manually in a relatively easy manner. This is provided for in the embodiment shown, by having the base 11 constructed with a series of evenly spaced stanchions 70 supporting a table 72 above it and high enough to project above the top of the column 16 with its supporting plate, when the latter is in its lowered position and not raised to support the wheel. The stanchions are converged inwardly from the base 71 to the table 72 to form an incline on which the wheel may be laid against and pushed up manually until it rests on the table 72. The table 72, has a large central hole 73 in it through which the column 16 and plate 52 may be raised when the wheel is to be tested. The column 16 and plate 52 with the incidental mechanisms are raised when the spindle 10 is raised. The spindle is raised hydraulically by its piston 75 being propelled upwardly in a cylinder 76 formed on the base 71 of the pedestal 10. Suitable connections and piping 77 provide for the hydraulic operation of the piston, in a conventional manner. This arrangement avoids the effort required to lift the wheel and tire to a horizontal position by hand and then dropping it down on to the balancing mechanism. In addition it reduces the danger of damaging the mechanism as no contact is made directly therewith until the wheel is resting on the table ready to be lifted on the supporting plate, when the hydraulic system is operated. The slope of the stanchions 70 permits the wheel and tire laid and inclined against them to be pushed up easily on to the table and there aligned for the balancing unit to lift and balance the wheel and tire. The purpose of the base is to avoid the necessity for lifting the wheel and tire by hand onto the whole device. It also enables the wheel and the tire to be slid off the device after the wheel has been tested and balanced, and then raised to an erect position so it can be rolled away. This makes the use of the balancing unit safer and easier to use, for heavy wheels and tires than it would by the balancing unit alone.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. In a wheel balancing machine, a pedestal, a hood surrounding said pedestal, means carried by said hood for adjusting its balance on the pedestal, a column inserted in said hood and fastened thereto and engaging the pedestal so as to be erect thereon when the hood is properly balanced, level indicating means carried by said column, a collar adjustably mounted on said column and having a circular ledge, a supporting plate resting on said ledge and having a hub surrounding said collar and a circular flange, an annular plate, said supporting plate being reversible upon said collar whereby in one position it carries the annular plate on one face of its circular flange and in the opposite position it carries the annular plate on the other face of its circular flange, and means on said annular plate for holding a wheel disc thereon in centered position.

2. In a machine as set forth in claim 1, means for locking said collar in its adjusted position.

3. In a machine as set forth in claim 1, means for facilitating the placing of a wheel on said annular plate, said means comprising a table for supporting the wheel, said table having a central opening to permit the passage of the column and the annular plate therethrough, a plurality of supporting stanchions extending from said table to the ground in a diverging manner, and hydraulic means located within the space circumscribed by said stanchions to raise the pedestal and the assembly of elements carried thereby to a point where said annular plate will receive the wheel disc.

4. In a wheel balancing machine, in combination, a pedestal, a hood surrounding said pedestal, means carried by said hood for adjusting its balance on the pedestal, a column inserted in said hood and fastened thereto and engaging the pedestal so as to be erect thereon when the hood is properly balanced thereon, level indicating means carried by said column, a supporting plate, means for supporting said plate on the column, said means including a collar adjustable on said column, and an annular plate carried by said supporting plate, said last mentioned plate having means for holding a wheel disc thereon in centered position, said wheel disc holding means on said annular plate comprising a plurality of circularly arranged removable and replaceable thimbles to support wheel discs of different sizes.

CHARLES W. TINKHAM.

REFERENCES CITED

The following references are of record in the file of this patent:

UNITED STATES PATENTS

| Number | Name | Date |
|---|---|---|
| 777,012 | Fairbanks | Dec. 6, 1904 |
| 890,710 | Riddell | June 16, 1908 |
| 1,977,297 | Weaver | Oct. 16, 1934 |
| 2,047,765 | Brabender | July 14, 1936 |
| 2,270,657 | Kraft | Jan. 20, 1942 |
| 2,301,958 | Lannen | Nov. 17, 1942 |
| 2,350,077 | Smith | May 30, 1944 |
| 2,478,477 | Graves | Aug. 9, 1949 |